(12) United States Patent
Mandai et al.

(10) Patent No.: US 7,112,348 B2
(45) Date of Patent: Sep. 26, 2006

(54) COATING METHOD AND APPARATUS

(75) Inventors: Toshihiro Mandai, Odawara (JP); Mikio Tomaru, Odawara (JP); Norio Shibata, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/732,273

(22) Filed: Dec. 11, 2003

(65) Prior Publication Data

US 2004/0131781 A1 Jul. 8, 2004

Related U.S. Application Data

(62) Division of application No. 10/253,427, filed on Sep. 25, 2002, now Pat. No. 6,833,157.

(30) Foreign Application Priority Data

| Sep. 28, 2001 | (JP) | ............................. 2001-302401 |
| Sep. 28, 2001 | (JP) | ............................. 2001-302402 |
| Jun. 28, 2002 | (JP) | ............................. 2002-190142 |
| Jun. 28, 2002 | (JP) | ............................. 2002-190143 |

(51) Int. Cl.
*B05D 5/00* (2006.01)
*B05D 3/12* (2006.01)
*B05C 11/10* (2006.01)

(52) U.S. Cl. .................. 427/130; 427/128; 427/294; 427/345; 427/350; 427/356; 427/358; 118/602; 118/50; 118/123; 118/126; 118/410

(58) Field of Classification Search ................ 427/130, 427/128, 345, 350, 356, 358, 359, 361; 118/50, 118/62, 602, 118, 123, 126, 410, 413, 414
See application file for complete search history.

(56) References Cited

U.S. PATENT DOCUMENTS

| 4,102,299 A | * | 7/1978 | Wallsten ...................... 118/50 |
| 4,521,459 A | | 6/1985 | Takeda |
| 4,537,801 A | | 8/1985 | Takeda |
| 5,108,795 A | | 4/1992 | Shibata et al. |
| 6,024,797 A | * | 2/2000 | Li et al. ...................... 118/665 |
| 6,231,671 B1 | | 5/2001 | Ciliske et al. |
| 6,759,091 B1 | * | 7/2004 | Mandai et al. ............... 427/356 |

FOREIGN PATENT DOCUMENTS

| JP | 58-109162 | 6/1983 |
| JP | 7-287843 | 10/1995 |

* cited by examiner

*Primary Examiner*—Katherine Bareford
(74) *Attorney, Agent, or Firm*—Sughrue Mion, PLLC

(57) ABSTRACT

The coating apparatus and method enable the coating liquid having been scraped-off to be reused without doing any one of the fluid adjusting treatment and the filtering treatment, while maintaining the features of the scraping-off type of extrusion coater, which is suitable for obtaining a uniform and extremely thin coating film. The coating head is provided with two slits: a coating slit and a recovering slit, and the excessive coating liquid having been discharged through the coating slit and applied to the web is scraped-off and recovered through the recovering slit.

19 Claims, 8 Drawing Sheets

COATING METHOD AND APPARATUS

This is a divisional of application Ser. No. 10/253,427 filed Sep. 25, 2002 now issued as U.S. Pat. No. 6,833,157 on Dec. 21, 2004; the disclosure of which is incorporated herein by reference.

BACKGROUND OF THE INVENTION

1. Field of the Invention

The present invention relates to coating method and apparatus, in particular to coating method and apparatus for use in manufacturing photosensitive materials and magnetic recording media.

2. Description of the Related Art

Photosensitive materials and magnetic recording media are manufactured through a coating step of forming a coating film by applying a prescribed coating liquid, such as magnetic liquid, to a continuously running sheet substrate strip (hereinafter referred to as "web"). In recent years, magnetic recording media such as magnetic recording tape particularly for broadcasting or computer use have been rapidly improved in capacity and recording density, and there has been needed a coating technology capable of providing a magnetic layer which is extremely thin and of which surface is smooth.

Coating apparatus for applying a coating liquid to the surface of a web include, for example, apparatus of types such as roll coater, gravure coating, roll coating plus doctor roll, extrusion coating, and slide coating; in recent years, apparatus of extrusion type have been commonly used.

One method which employs an extrusion type of apparatus and in which the tip of a coating head is pushed against a web, as described in Japanese Patent Application Publication No. 58-109162, has been commonly used in the field of manufacturing magnet recording media, since a thin and uniform coating layer can be obtained just by increasing the fluid pressure at the tip of the coating head utilizing the web tension, thereby eliminating the air accompanying the web. However, even in the method of applying a single coat of coating liquid using this type of coating head, the reduction in coating thickness is limited.

As a further method for forming a much thinner coating layer, there is a method in which a very thin coating layer can be formed by applying a coating liquid to a web to excess using a web-pushing type of extrusion coater and then scraping-off the excess coating liquid with a blade disposed on the downstream side of the extrusion coater, as described in Japanese Patent Application Publication No. 7-287843. In this case, the device which applies a coating liquid to a web to excess is not necessarily limited to the web-pushing type of extrusion coater, but coaters such as roller coater type coater, gravure coater and extrusion coater equipped with a back-up roll can be used.

In the method using the conventional scraping-off type of extrusion coater shown in FIG. 8, however, since the coating liquid recovered by scraping-off, with a blade 6, the excess amount of coating liquid having been applied to a web 5 at a coating head 3 has been once exposed to the atmosphere, the solvent contained in the coating liquid has been volatilized, thereby changes are caused in the fluid physical properties such as viscosity and solid content concentration. Thus, the method has a disadvantage in that, since the use of the coating liquid, as it is, of which viscosity has been changed adversely affects the amount of the coating liquid to be scraped-off or the final thickness of the coating film after being scraped-off with the blade 6, the recovered coating liquid must undergo treatment for adjusting its physical properties such as viscosity and solid content concentration in a coating liquid adjusting tank 8 before reused. In addition, since the recovering line for recovering the coating liquid is opened to the atmosphere, dust from the outside of the recovering line is likely to be included in the recovered coating liquid. Thus, the method also has a disadvantage in that dust cannot be fully removed even if the recovered coating liquid is filtered through a filter 9 when pumping the recovered coating liquid from a supply tank 1 to the coating head 3 with a pump 2.

SUMMARY OF THE INVENTION

The present invention has been made in the light of such circumstances, and an object of the present invention is to provide coating method and apparatus which enable the reuse of the coating liquid having been scraped-off from a web without doing any one of the coating liquid adjusting treatment and the filtering treatment, while maintaining the features of the scraping-off type of extrusion coater, which is suitable for obtaining a uniform and extremely thin coating film layer.

Another object of the invention is to provide a coating apparatus which enables the obtaining of a uniform and extremely thin coating film layer equal to or superior to that provided by the scraping-off type extrusion coater equipped with a doctor blade and enables the reuse of the coating liquid having been recovered from a web without doing any one of the coating liquid adjusting treatment and the filtering treatment.

In order to accomplish the above-described object, the present invention is directed to a coating method, comprising the steps of: pre-coating one side of a continuously running sheet substrate strip with a coating liquid, using a pre-coating device, in an amount in excess of that capable of obtaining an intended final coating thickness; and then scraping-off an excess amount of coating liquid with a scraping-off device provided on a downstream side along a running direction of the substrate relative to the pre-coating device, wherein the coating liquid having been applied to the substrate is not opened to the atmosphere during a time from the pre-coating until the scraping-off.

According to the present invention, the coating liquid having been scraped-off from the continuously running substrate strip can be reused without doing any one of the coating liquid adjusting treatment and the filtering treatment, while maintaining the features of the scraping-off type of extrusion coater, which is suitable for obtaining a uniform and extremely thin coating film layer, since the coating liquid having been applied to the substrate is not opened to the atmosphere during the time from the pre-coating of the substrate with the coating liquid until the scraping-off of the express amount of the coating liquid.

The term "the coating liquid having been applied to the substrate is not opened to the atmosphere" herein used means the state in which at least the surface of the substrate to which the coating liquid has been applied is not opened to the atmosphere, and it does not matter whether the lateral edge portions of the substrate are opened to the atmosphere or not. And this is the same in the following.

In an aspect of the present invention, the coating liquid having been scraped-off is recovered through a recovering line as a closed system and the recovered coating liquid is reused. Allowing the recovering line to be a closed system enables the fluid physical properties, such as viscosity and solid content concentration, of the coating liquid to be reused to be much less changed and dust and the like to be not included in the coating liquid.

In an aspect of the present invention, a desired coating thickness is obtained by adjusting a fluid resistance of the recovering line. Changing the fluid resistance of the recovering line enables the coating thickness to be varied. This case also embraces one form of the method in which the adjustment of the fluid resistance of the recovering line is combined with at least any one of the adjustment of the coating speed, the adjustment of the coating liquid viscosity and the adjustment of the solid content concentration.

In an aspect of the present invention, a desired coating thickness is obtained by adjusting at least one of the amount of the coating liquid to be used for the pre-coating and an amount of coating liquid to be scraped-off. This method enables a desired coating thickness to be obtained in a simple and easy manner.

In an aspect of the present invention, the amount of the coating liquid used for the pre-coating and the amount of the coating liquid scraped-off are measured with flowmeters, respectively, and at least one of the amounts is adjusted to allow a difference between the two measured amounts to provide the desired coating thickness. This method enables desired coating thickness to be obtained with a high accuracy.

In an aspect of the present invention, the desired coating thickness is obtained by adjusting a running speed of the substrate. Adjusting the running speed of the substrate (i.e., a coating speed) enables the coating thickness to be varied.

In an aspect of the present invention, the desired coating thickness is obtained by adjusting a viscosity of the coating liquid. Adjusting the viscosity of the coating liquid enables the coating thickness to be varied. This case also embraces one aspect of the method in which the adjustment of the coating liquid viscosity is combined with the adjustment of the coating speed.

In an aspect of the present invention, the desired coating thickness is obtained by adjusting a solid content concentration of the coating liquid. Changing the solid content concentration of the coating liquid enables the coating thickness to be varied. This case also embraces one aspect of the method in which the adjustment of the solid content concentration is combined with at least either one of the adjustment of the coating speed and the adjustment of the coating liquid viscosity.

In an aspect of the present invention, the scraping-off device is constructed so that the scraping-off device scrapes-off the excess amount of coating liquid by allowing a scraping-off portion thereof and the substrate to be pushed relative to each other, thereby pressing the coating liquid which has been applied to the substrate, the desired coating thickness being obtained by varying a pressing force applied to the coating liquid. This case also embraces one aspect of the method in which the adjustment of the pressing force applied to the coating liquid is combined with at least any one of the adjustment of the fluid resistance of the recovering line, the adjustment of the solid content concentration of the coating liquid, the adjustment of the coating liquid viscosity, the adjustment of at least either one of the amount of the coating liquid used for pre-coating and the amount of the coating liquid scraped-off and the adjustment of the running speed of the sheet substrate strip.

In an aspect of the present invention, the pressing force is obtained by lapping the substrate over the scraping-off portion and varied by adjusting a tensile force of the substrate exerted in the running direction of the substrate.

In an aspect of the present invention, the pressing force is obtained by arranging a back-up roller on the back side of the substrate, to which no coating liquid is applied, in such a manner as to face the scraping-off portion and is adjusted by adjusting the clearance between the scraping-off portion and the back-up roller.

In an aspect of the present invention, the pressing force is obtained by arranging a back-up roller made of an elastic material on the back side of the substrate, to which no coating liquid is applied, in such a manner as to face the scraping-off portion and is adjusted by adjusting at least one of a longitudinal elasticity modulus and a hardness of the back-up roller.

In an aspect of the present invention, the pressing force is obtained by arranging a spraying device which sprays fluid on the back side of the substrate, to which no coating liquid is applied, in such a manner as to face the scraping-off portion and is adjusted by adjusting a spraying pressure of the spraying device.

In an aspect of the present invention, the coating liquid is a magnetic coating liquid with magnetic particles dispersed therein. The coating method of the present invention is extremely effective in coating the substrate with a magnetic coating liquid which requires accuracy in the adjustment of the physical properties such as viscosity and solid content concentration.

In order to accomplish the above-described object, the present invention is also directed to a coating apparatus, comprising: a pre-coating device which pre-coats one side of a continuously running sheet substrate strip with a coating liquid in an amount in excess of that capable of obtaining an intended final coating thickness; a scraping-off device which scrapes-off an excess amount of coating liquid, the scraping-off device being arranged on a downstream side along a running direction of the substrate relative to the pre-coating device; and a closing mechanism which prevents the coating liquid having been applied to the substrate from being opened to the atmosphere between the pre-coating device and the scraping-off device.

According to the present invention, the coating liquid having been scraped-off from the continuously running substrate strip can be reused without doing any one of the coating liquid adjusting treatment and the filtering treatment, while maintaining the features of the scraping-off type of extrusion coater, which is suitable for obtaining a uniform and extremely thin coating film layer, since a mechanism is provided for preventing the coating liquid having been applied to the substrate from being opened to the atmosphere during the time from the pre-coating of the substrate with the coating liquid until the scraping-off of the excess amount of the coating liquid.

In an aspect of the present invention, a pre-coating portion of the pre-coating device and a scraping-off portion of the scraping-off device are integrated in a coating head; the closing mechanism is formed by allowing a lip surface of the coating head and the substrate to be adjacent to each other; and the pre-coating portion is arranged on the upstream side of the coating head, and the scraping-off portion is arranged on the downstream side of the coating head. The closing mechanism thus formed and constructed enables the coating liquid having been applied to the substrate not to be opened to the atmosphere during the time from the pre-coating of the substrate with the coating liquid until the scraping-off of the express amount of the coating liquid, since the coating liquid applied to the substrate to excess at the pre-coating portion is moved to the scraping-off portion, where the excess amount of the same is scraped-off, in such a state that it is sandwiched between the substrate and the lip surface.

In an aspect of the present invention, the pre-coating portion is provided with a coating slit for discharging the coating liquid; and the scraping-off portion is provided with a recovering slit for recovering the coating liquid having been scraped-off. Thus, all the paths of the pre-coating device and the scraping-off device can be a closed system.

In an aspect of the present invention, the coating apparatus further comprises: a pair of guide rollers which laps the substrate over the lip surface of the coating head, the pair of guide rollers being arranged on upstream and downstream sides relative to the coating head, wherein the desired thickness is obtained by adjusting a tensile force of the substrate exerted in the running direction of the substrate to press the coating liquid having been applied to the substrate.

In an aspect of the present invention, the coating apparatus further comprises: a back-up roller which is arranged on a back side of the substrate, to which no coating liquid is applied, in such a manner as to face the lip surface of the coating head, wherein the desired thickness is obtained by adjusting a clearance between the lip surface and the back-up roller to press the coating liquid having been applied to the substrate.

In an aspect of the present invention, the coating slit is in communication with a supplying line for supplying the coating liquid to be used for pre-coating; the recovering slit is in communication with a recovering line for recovering the coating liquid having been scraped-off; the supplying line and the recovering line are provided with flowmeters to measure the amount of the coating liquid used for pre-coating and the amount of the coating liquid having been scraped-off, respectively; and a flow control device is provided which controls at least one of a flow of the supplying line and a flow of the recovering line to allow a difference between the measured flows to provide the desired coating thickness. This coating apparatus enables the desired amount of the coating liquid to be applied to the substrate with a high accuracy.

In an aspect of the present invention, at least one of a doctor lip surface between the coating slit and the recovering slit and a recovering lip surface for scraping-off the excess amount of coating liquid, both constituting the lip surface of the coating head, has a shape of one of a circular arc projecting toward the substrate, a combined surface of at least two planes successively provided and forming a vertex projecting toward the substrate, and a combined surface of a circular arc curvature projecting toward the substrate and a plane. This enables the fluid pressure at the lip surface of the coating head to be high. Thus, the air accompanying the substrate is eliminated, and thereby a thin and uniform coating layer can be obtained.

In an aspect of the present invention, a relation $R_2 > R_3$ holds, where $R_2$ represents a radius of curvature of the doctor lip surface and $R_3$ represents a radius of curvature of the recovering lip surface. This enables the fluid pressure generated at the recovering lip surface to be high, thereby enabling the coating liquid to be easily scraped-off.

In an aspect of the present invention, the scraping-off portion is provided with a rotating rod which comes in contact with the surface of the substrate to which the coating liquid has been applied and scrapes-off the excess amount of coating liquid. Thus, when foreign matter is trapped between the rotating rod and the substrate, the foreign matter is easily eliminated, which results in reduction of streak defect.

In an aspect of the present invention, a pre-coating portion of the pre-coating device and a scraping-off portion of the scraping-off device are separately formed; and the closing mechanism comprises a covering member which covers at least the surface of the substrate to which the coating liquid has been applied, the covering member being arranged along a running route of the substrate between the pre-coating portion and the scraping-off portion. This enables the coating liquid having been applied to the substrate not to be opened to the atmosphere during the time from the completion of the pre-coating of the substrate with the coating liquid until the scraping-off of the express amount of the coating liquid, since the coating liquid applied to the substrate at the pre-coating portion is moved to the scraping-off portion, where the excess amount of the same is scraped-off, in such a state that it is sandwiched between the substrate and the covering member. Accordingly, it can be constructed in such a manner as to enable the coating liquid having been applied to the substrate not to be opened to the atmosphere even when the pre-coating portion of the pre-coating device and the scraping-off portion of the scraping-off device are formed separately.

In an aspect of the present invention, the pre-coating portion is provided with a coating slit for discharging the coating liquid; the scraping-off portion is provided with a recovering slit for recovering the coating liquid having been scraped-off; and a back-up roller is provided in such a manner as to face both of the pre-coating portion and the scraping-off portion. This enables all the paths of the pre-coating device and the scraping-off device to be a closed system even when the pre-coating portion and the scraping-off portion are separately formed, since providing the back-up roller and the guide member allows the pre-coating portion and the scraping-off portion to be constructed as if they were integrally formed.

In order to accomplish the above-described object, the present invention is also directed to a coating method, comprising the steps of: pre-coating one side of a continuously running sheet substrate strip with a coating liquid, using a pre-coating device, in an amount in excess of that capable of obtaining an intended final coating thickness; and then sucking-up an excess amount of coating liquid using a suction device provided on a downstream side along a running direction of the substrate relative to the pre-coating device, wherein the coating liquid having been applied to the substrate is not opened to the atmosphere during a time from the pre-coating until the sucking-up.

According to the present invention, one side of the continuously running sheet substrate strip is pre-coated with the coating liquid, using the pre-coating device, in the amount in excess of that capable of obtaining an intended final coating thickness and then the excess amount of the coating liquid is sucked-up using the suction device provided on the downstream side along the running direction of the substrate relative to the pre-coating device. As described so far, since the coating method of the present invention forcibly sucks-up the excess amount of the coating liquid using the suction device, the thickness of the coating liquid applied to the substrate can be controlled to a desired coating thickness with a higher accuracy compared with the conventional scraping-off type of method which employs a doctor blade. Furthermore, the coating liquid having been sucked-up from the continuously running sheet substrate strip can be reused without doing any one of the coating liquid adjusting treatment and the filtering treatment, since the coating liquid having been applied to the substrate is not opened to the atmosphere during the time from the completion of the pre-coating of the substrate with the coating liquid until the sucking-up of the excess amount of the coating liquid. Thus, a uniform and extremely thin coating film layer can be obtained which is equal to or superior to that obtained by the scraping-off type of method and the recovered coating liquid can be reused without doing any one of the coating liquid adjusting treatment and the filtering treatment. In this case, in order to obtain the above-described desired coating thickness, preferably at least any one of the running speed of the substrate, and the viscosity and the solid content concentration of the coating liquid is adjusted. Preferably the coating liquid is a magnetic coating with magnetic particles dispersed therein.

In an aspect of the present invention, a sucking force of the suction device is generated with a pump. In this method, the sucking force can be controlled easily by adjusting the driving speed of the pump.

In an aspect of the present invention, the coating liquid having been sucked-up with the suction device is recovered through a recovering line as a closed system and the recovered coating liquid is reused. Forming the recovering line as a closed system enables the fluid physical properties, such as viscosity and solid content concentration, of the coating liquid reused to be much less changed and makes it hard for dust and the like to be included into the coating liquid.

In an aspect of the present invention, a wet thickness of the coating liquid applied to the substrate through the pre-coating device is 3 mL/m$^2$ or more. On the substrate from which the excess amount of the coating liquid has been sucked-up, a satisfactory coating film surface, which is free from streak defect, is likely to be formed.

In an aspect of the present invention, the desired coating thickness is obtained by adjusting at least one of the amount of the coating liquid to be used for pre-coating and an amount of the coating liquid to be sucked-up. This coating method enables the desired coating thickness to be obtained with a high accuracy.

In an aspect of the present invention, the amount of the coating liquid used for pre-coating and the amount of the coating liquid sucked-up are measured with flowmeters, respectively, and at least one of the amounts is adjusted to allow a difference between the two measured amounts to provide the desired coating thickness. This coating method enables the desired coating thickness to be obtained with a high accuracy. In this case, the adjustment is preferably conducted using a pair of pumps: a suction pump as a suction device; and a supply pump for supplying the coating liquid.

In order to accomplish the above-described object, the present invention is also directed to a coating apparatus, comprising: a pre-coating device which pre-coats one side of a continuously running sheet substrate strip with a coating liquid in an amount in excess of that capable of obtaining an intended final coating thickness; a suction device which sucks-up an excess amount of coating liquid, the suction device being arranged on a downstream side along a running direction of the substrate relative to the pre-coating device; and a closing mechanism which prevents the coating liquid having been applied to the substrate from being opened to the atmosphere between the pre-coating device and the suction device.

According to the present invention, one side of the continuously running sheet substrate strip is pre-coated with the coating liquid, using the pre-coating device, in the amount in excess of that capable of obtaining an intended final coating thickness and then the excess amount of the coating liquid is sucked-up using the suction device provided on the downstream side along the running direction of the substrate relative to the pre-coating device. As described so far, since the coating apparatus of the present invention forcibly sucks-up the excess amount of the coating liquid using the suction device, the amount of the coating liquid applied to the substrate can be controlled to a desired coating amount with a higher accuracy compared with the conventional scraping-off type of method which employs a doctor blade. Furthermore, the coating liquid having been sucked-up from the continuously running sheet substrate strip can be reused without doing any one of the coating liquid adjusting treatment and the filtering treatment, since the closing mechanism is provided for preventing the coating liquid having been applied to the substrate from being opened to the atmosphere during the time from the completion of the pre-coating of the substrate with the coating liquid until the sucking-up of the excess amount of the coating liquid.

In an aspect of the present invention, the sucking force of the suction device is generated with a metering pump. The sucking force can be controlled easily by adjusting the driving speed of the pump, and moreover, the use of the metering pump enables the control of the sucking force to be more accurate.

In an aspect of the present invention, a pre-coating portion of the pre-coating device and a suction portion of the suction device are integrated in a coating head; the closing mechanism is formed by allowing a lip surface of the coating head and the substrate to be adjacent to each other; and the pre-coating portion is arranged on the upstream side of the coating head, and the suction portion is arranged on the downstream side of the coating head. This enables the coating liquid having been applied to the substrate not to be opened to the atmosphere during the time from the completion of the pre-coating of the substrate with the coating liquid until the sucking-up of the excess amount of the coating liquid, since the coating liquid applied to the substrate at the pre-coating portion is moved to the suction portion, where the excess amount of the same is scraped-off, in such a state that it is sandwiched between the substrate and the lip surface.

In an aspect of the present invention, the pre-coating portion is provided with a coating slit for discharging the coating liquid; and the suction portion is provided with a recovering slit for recovering the coating liquid having been sucked-up. Thus, all the paths of the pre-coating device and the suction device can be a closed system.

In an aspect of the present invention, the coating apparatus further comprises a pair of guide rollers which laps the substrate over the lip surface of the coating head, the pair of guide rollers being arranged on upstream and downstream sides relative to the coating head.

In an aspect of the present invention, the coating apparatus further comprises a back-up roller which makes the substrate adjacent to the lip surface of the coating head, the back-up roller being arranged on a back side of the substrate, to which no coating liquid is applied.

In an aspect of the present invention, the coating slit is in communication with a supplying line for supplying the coating liquid to be used for pre-coating; the recovering slit is in communication with a recovering line for recovering the coating liquid having been sucked-up; the supplying line and the recovering line are provided with flowmeters to measure the amount of the coating liquid used for pre-coating and the amount of the coating liquid having been sucked-up, respectively; and a flow control device is provided which controls at least one of a flow of the supplying line and a flow of the recovering line to allow a difference between the measured flows to provide the desired coating thickness. This coating apparatus enables the desired amount of the coating liquid to be applied to the substrate with a high accuracy.

In an aspect of the present invention, a pre-coating portion of the pre-coating device and a suction portion of the suction device are separately formed; and the closing mechanism comprises a covering member which covers at least the surface of the substrate to which the coating liquid has been applied, the covering member being arranged along a running route of the substrate between the pre-coating portion and the suction portion. Thus, since the coating liquid having been applied to the substrate at the pre-coating portion is moved to the suction portion, where the excess amount of coating liquid is sucked-up, in such a state that it is sandwiched between the substrate and the covering member, the coating liquid having been applied to the substrate is not opened to the atmosphere between the pre-coating portion and the suction portion. Accordingly, this coating apparatus enables the coating liquid having been applied to the substrate not to be opened to the atmosphere even when the pre-coating portion and the suction portion are separately formed.

In an aspect of the present invention, the pre-coating portion is provided with a coating slit for discharging the coating liquid; the suction portion is provided with a recovering slit for recovering the coating liquid having been sucked-off; and a back-up roller is provided in such a manner as to face both of the pre-coating portion and the suction portion. This enables all the paths of the pre-coating device and the suction device to be a closed system even when the pre-coating portion and the suction portion are separately formed, since the back-up roller and the guide member allows the pre-coating portion and the suction portion to be constructed as if they were integrally formed.

The substrate used in the present invention may include the one on which a primer has been applied and set in advance.

BRIEF DESCRIPTION OF THE DRAWINGS

The nature of the present invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

In the following, preferred embodiments of the present invention will be described in detail with reference to the accompanying drawings.

Figure 1:
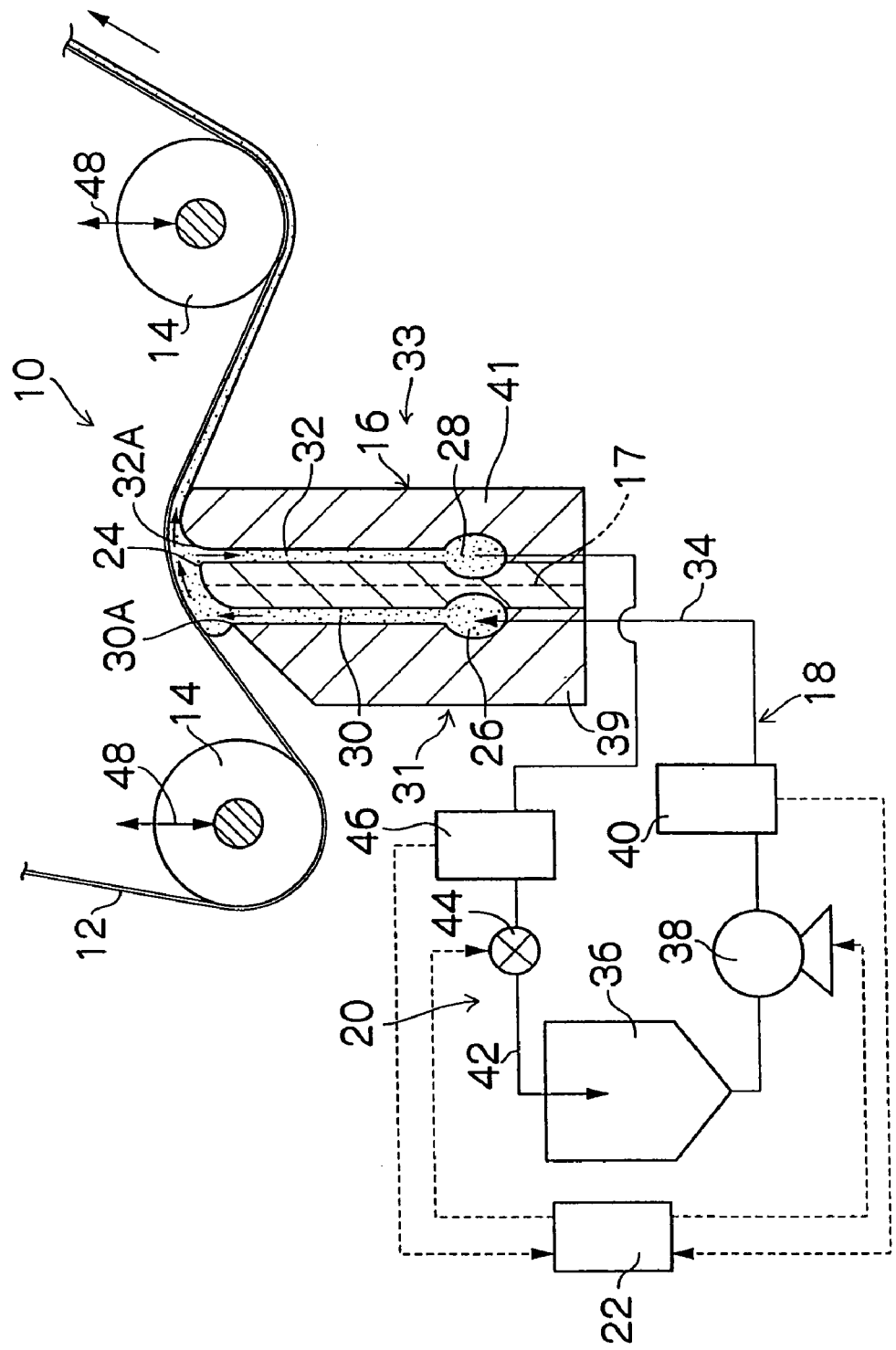
FIG. 1 is a schematic view illustrating a first embodiment of the coating apparatus according to the present invention, in which the pre-coating portion of a pre-coating device and the scraping-off portion of a scraping-off device are integrated into a coating head.

FIG. 1 is a schematic view illustrating the entire construction of a first embodiment of the coating apparatus according to the present invention, in which a pre-coating portion 39 of a pre-coating device 31 and a scraping-off portion 41 of a scraping-off device 33 are integrated into a coating head 16. If the integrated coating head 16 is divided for explanation into the pre-coating portion 39 and the scraping-off portion 41, the two portions are marked off from each other with a broken line 17 shown in the coating head 16.

As shown in FIG. 1, the coating apparatus 10 comprises a guide roller 14 for guiding a running web 12, a coating head 16, a pre-coating device 31, a scraping-off device 33, and a controller 22 for controlling the pre-coating device 31 and the scraping-off device 33. The coating head 16 is arranged in such a manner as to face the continuously running web 12 with its lip surface 24, which is provided on the tip thereof, adjacent to the web 12.

The pre-coating device 31 comprises a pre-coating portion 39 integrally formed on the coating head 16 and a supplying line 18 for supplying a coating liquid to the pre-coating portion 39 in an amount in excess of the amount required for coating the web 12. And the scraping-off device 33 comprises a scraping-off portion 41 integrally formed on the coating head 16 and a recovering line 20 for recovering the excess coating liquid having been scraped-off at the scraping-off portion 41.

Figure 2:
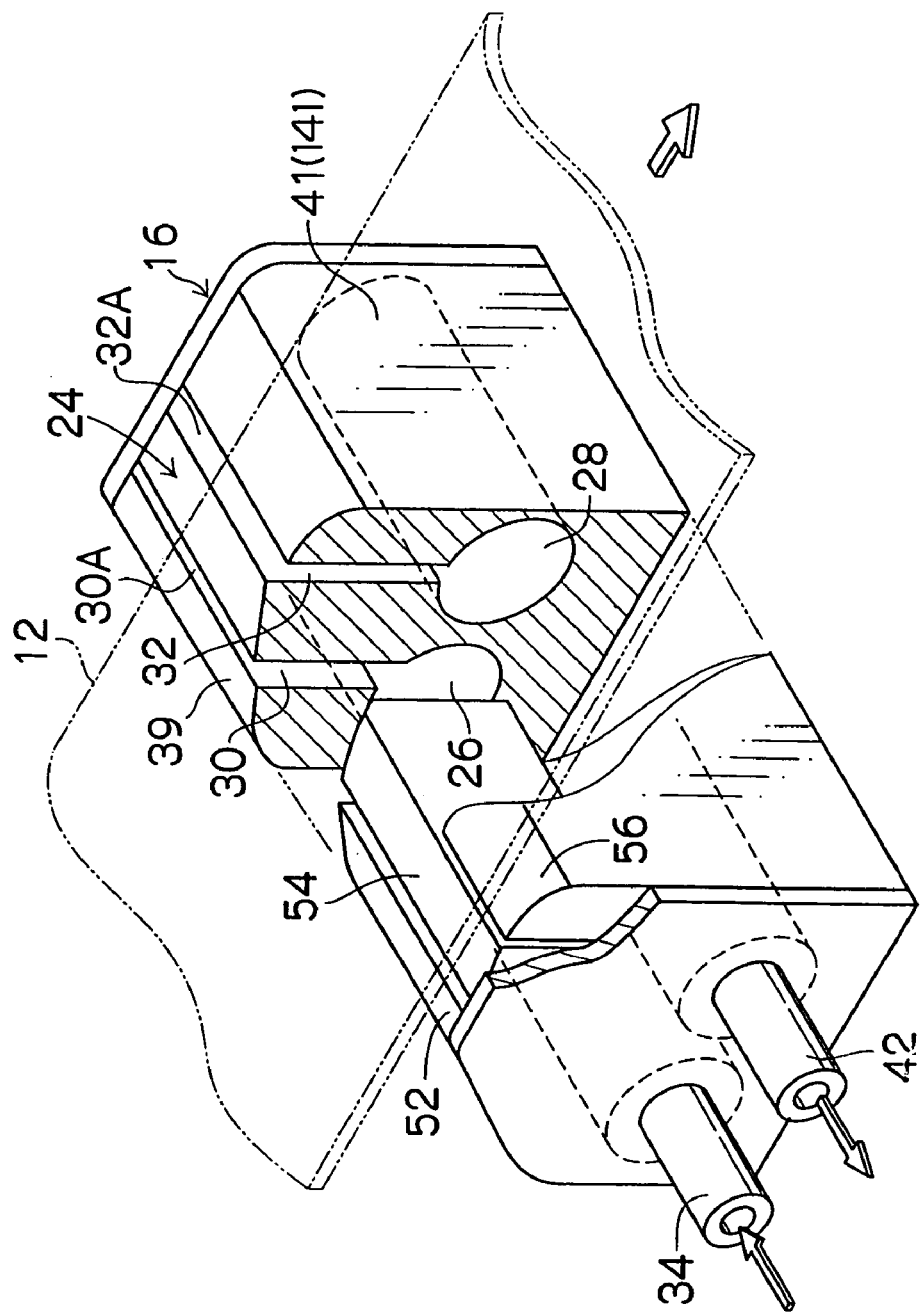
FIG. 2 is a partially cut-away perspective view illustrating the structure of the coating head of FIG. 1 or 7.

As shown in FIGS. 1 and 2, within the coating head 16 a pair of cylindrical pocket portions 26, 28, comprising a coating pocket portion 26 and a recovering pocket portion 28, are formed in parallel with each other in the widthwise direction of the web. Within the coating head 16, a coating slit 30 with a discharge port 30A in the lip surface 24 and a recovering slit 32 with a recovering port 32A in the lip surface 24 on the downstream side along the running direction of the web 12 relative to the discharge port 30A are also formed, and the coating slit 30 and the recovering slit 32 are in communication with the coating pocket 26 and the recovering pocket 28, respectively. Thus, the pre-coating portion 39 and the scraping-off portion 41 are integrated into the coating head 16. The coating pocket portion 26 is connected to the supplying line 18 and the recovering pocket portion 28 is connected to the recovering line 20. The coating slit 30 and the recovering slit 32 are narrow passageways connecting the respective pocket portions 26, 28 and the lip surface 24 and are extended in the widthwise direction of the web 12. A coating liquid is supplied from the supplying line 18 to the coating pocket 26 of the coating head 16 in an amount in excess of the desired amount to be applied to the web 12, and the excess amount of coating liquid having been recovered through the recovering slit 32 into the recovering pocket portion 28 is discharged into the recovering line 20. While one type of coating head is illustrated in FIG. 2 in which, as a method for pumping a coating liquid into the coating pocket portion 26, the coating liquid is supplied from one side of the coating pocket portion 26, there are other types in which a coating liquid is supplied from one side of the coating pocket portion 26 and drawn from the other side, or in which a coating liquid is supplied from the middle portion of the coating pocket portion 26 and branched into both sides. Any of these types of coating heads can be applied.

The supplying line 18 is such that its supplying piping 34 connects a coating liquid tank 36 and the coating pocket portion 26 of the coating head 16 and in the middle of the supplying piping 34 are provided a supply pump 38 for varying the amount of the coating liquid supplied to the coating pocket portion 26 and a supply flowmeter 40 for measuring the amount of the coating liquid flowing through the supplying piping 34, as shown in FIG. 1.

Meanwhile, the recovering line 20 is such that its recovering piping 42 connects the recovering pocket portion 28 and the coating liquid tank 36 and in the middle of the recovering piping 42 are provided a valve 44 for varying the amount of the coating liquid recovered from the recovering pocket portion 28 by changing the flow resistance of the recovering line 20 and a recovery flowmeter 46 for measuring the amount of the coating liquid flowing through the recovering piping 42. Thus, supplying/recovering lines 18, 20 as a closed system which are not opened to the atmosphere are constructed between the coating head 16 and the coating liquid tank 36.

Figure 3:
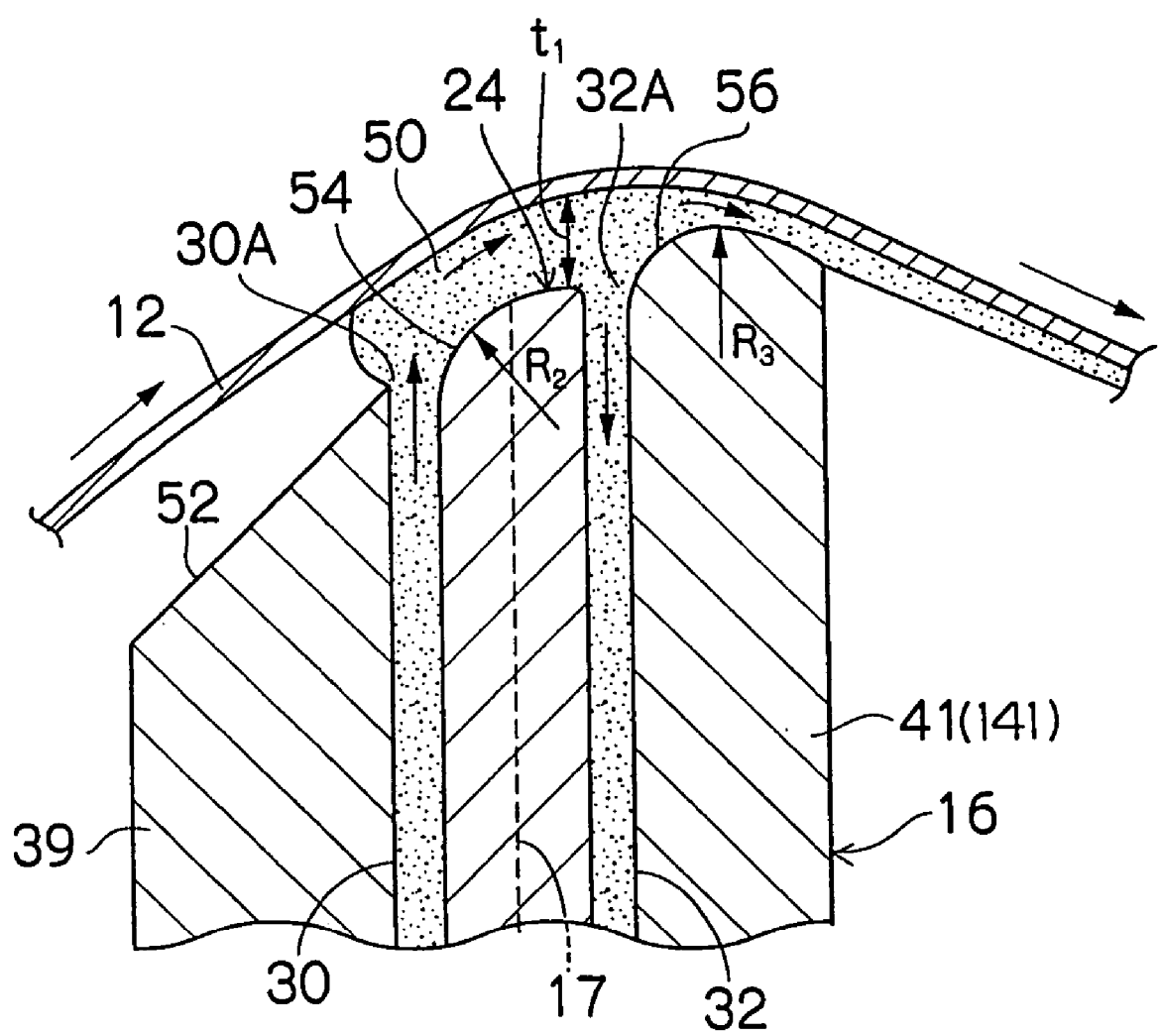
FIG. 3 is a cross sectional view illustrating the lip surface of the coating head of FIG. 1 or 7.

Guide rollers 14 are provided as a pair on both of the upstream and downstream sides relative to the coating head 16 in the running direction of the web, respectively, and arranged in the positions lower than the tip of the coating head 16. Thus, the continuously running web 12 is lapped over and made adjacent to the lip surface 24 of the coating head 16 in such a manner as to be pushed against the same. As a result, the coating liquid sandwiched between the web 12 and the lip surface 24 is pressed. The pair of guide rollers 14, 14 are provided in such a manner as to be slidable in the slide direction 48, 48 shown in FIG. 1, enabling the tensile force of the web 12 exerted in the running direction of the web to be varied. As a sliding mechanism of the guide rollers 14, 14, any mechanisms can be employed as long as they can provide the guide rollers with a slight sliding, and, for example, the mechanism of a feed screw can be employed. Varying the tensile force of the web 12 exerted in the running direction of the web changes the pushing force of the web 12 against the lip surface 24 of the coating head 16, which in turn changes the pressing force applied to the coating liquid sandwiched by the web 12 and the lip surface 24, resulting in changes in the amount of the coating liquid scraped-off at the scraping-off portion 41. Thus, a desired coating thickness can be obtained. As described so far, the scraping-off device 33 in the present invention is constructed so that it scrapes-off the excess amount of coating liquid utilizing the edge portion of the recovering port 32A of the recovering slit 32 and a recovering lip surface 56 while pressing the coating liquid having been applied to the web 12 with the lip surface 24 of the coating head 16 pushed relative to the web 12, and the coating liquid having been scraped-off is recovered through the recovering line 20. In this case, the shapes of a doctor lip surface 54 between the coating slit 30 and the recovering slit 32 and of a recovering lip surface 56 on the downstream side relative to the recovering slit 32, seen along the running direction of the web, both of which constitute the lip surface 24 of the coating head 16, preferably have curvatures in the form of a circular arc projecting toward the web 12, as shown in FIG. 3. Although not shown in the figure, in addition to a circular arc curvature, each lip surface may have a combined surface of two or more planes successively provided and forming a vertex projecting toward the web 12 or a combined surface of a circular arc curvature projecting toward the web 12 and a plane. Thus, the air accompanying the web 12 is eliminated, and thereby a thin and uniform coating layer can be obtained. Further, the relation, $R_2 > R_3$ preferably holds, where $R_2$ represents the radius of curvature of the doctor lip surface 54 and $R_3$ the radius of curvature of the recovering lip surface 56. This makes the pressure occurring on the recovering lip surface 56 higher than that occurring on the doctor lip surface 54, thereby allowing the coating liquid to be scraped-off more easily. The blocks having the doctor lip surface 54 and the recovering lip surface 56, respectively, are constructed using a rigid material such as carbide, fine ceramics, alumina A-150 or zirconia, or using members formed by covering the blocks with any one of the materials, and the surfaces of the blocks are subjected to surface treatment so that they have a surface roughness, $R_{max}$ of 0.5 μm or less, preferably 0.2 μm or less.

Into the controller 22 are inputted the measured values of the amount of the coating liquid supplied and the amount of the coating liquid recovered, which are measured with a supply flowmeter 40 and a recovery flowmeter 46, respectively. Further, in the controller 22, an operation is conducted to determine whether or not the difference in amount between the coating liquid having been supplied and the coating liquid having been recovered corresponds to the desired amount of the coating liquid applied to the web 12, and if the difference does not correspond to the desired amount, the controller 22 controls at least one of the supply pump 38 and the valve 44 to make both amount correspond to each other.

In the following, the working of the first embodiment of the coating apparatus 10 constructed as above will be described.

The coating liquid pumped out in excess from the coating liquid tank 36 with the supply pump 38, flowing through the supplying piping 34 and supplied to the coating pocket portion 26 of the coating head 16 rises up through the coating slit 30 and is discharged from the discharge port 30A, while the amount of the coating liquid flowing through the supplying piping 34 is measured with the supply flowmeter 40 and inputted into the controller 22. The coating liquid discharged to excess from the discharge port 30A is applied to the web 12 while forming a bead 50 between the lip surface 24 of the coating head 16 and the web 12 running adjacent to the lip surface 24. In other words, the coating liquid supplied to excess is applied to the web 12 in such a state that the discharge force which discharges the coating liquid from the discharge port 30A and pushing force of the web 12 against the lip surface 24 of the coating head 16 are well balanced. Meanwhile, at the recovering port 32A of the recovering slit 32 formed in the lip surface 24 on the downstream side relative to the discharge port 30A in the running direction of the web, the excessive coating liquid is scraped-off into the recovering slit 32. Specifically, the coating liquid applied to the web 12 to excess at the discharge port 30A of the coating slit 30 accompanies the web 12 and reaches the recovering port 32A of the recovering slit 32, where part of the coating liquid applied to excess, that is, the excess coating liquid is scraped-off by the edge portion of the recovering port 32A and the recovering lip surface 56, which will be described later. Thus, the coating liquid applied to the web 12 to excess is divided into two: coating liquid flowing through the recovering slit 32; and coating liquid decreased to the desired amount and continuously accompanying the web 12. The coating liquid distributed into the recovering slit 32 forms the stream of the coating liquid which reaches the coating liquid tank 36 through the recovering pocket portion 28 and the recovering line 20 and recovered into the coating liquid tank 36. And the amount of the coating liquid flowing through the recovering piping 42 is measured with the recovery flowmeter 46 and inputted into the controller 22.

In this coating/recovering operation, the controller 22 controls at least one of the driving speed of the supply pump 38 and the amount of the valve 44 opening so as to allow the difference in amount, having been measured with the supply flowmeter 40, between the coating liquid having been supplied and the coating liquid having been recovered and measured with the recovery flowmeter 46 to correspond to the desired amount of the coating liquid to be applied to the web 12. Although not shown in FIG. 1, the controller 22 and the sliding mechanism of the guide rollers 14, 14 may be connected by radio or a signal cable to automatically control the slide of the guide rollers 14, 14 with the controller 22. In this case, the sliding amounts of the guide rollers are not necessarily the same, and a desired thickness of the coating liquid layer may be obtained by allowing the pushing force of the web 12 against the recovering lip surface 56 to be larger than that against the doctor lip surface 54 so as to apply much larger pressing force to the coating liquid sandwiched between the web 12 and the recovering lip surface 56, thereby varying the amount of the coating liquid to be scraped-off. Further, a desired thickness of the coating liquid layer may also be obtained by allowing the controller 22 to control all of the driving speed of the supply pump 38, the amount of the valve 44 opening, and the sliding amount of the pair of guide rollers 14, 14 based on the measured values with the supply flowmeter 40 and the recovery flowmeter 46. Further, a desired thickness of the coating liquid layer may also be obtained by adjusting the running speed of the web 12, that is, the coating speed. Still further, a desired thickness of the coating liquid layer may also be obtained by adjusting the viscosity and the solid content concentration of the coating liquid. Further, a desired thickness of the coating liquid layer may also be obtained by adjusting the flow resistance of the recovering line 20. The flow resistance can be adjusted by, for example, adjusting the amount of the opening of the valve 44 provided on the recovering line 20. Further, a desired thickness of the coating liquid layer may also be obtained by adjusting the combination of coating speed, viscosity of the coating liquid, solid content concentration and flow resistance.

Figure 4:
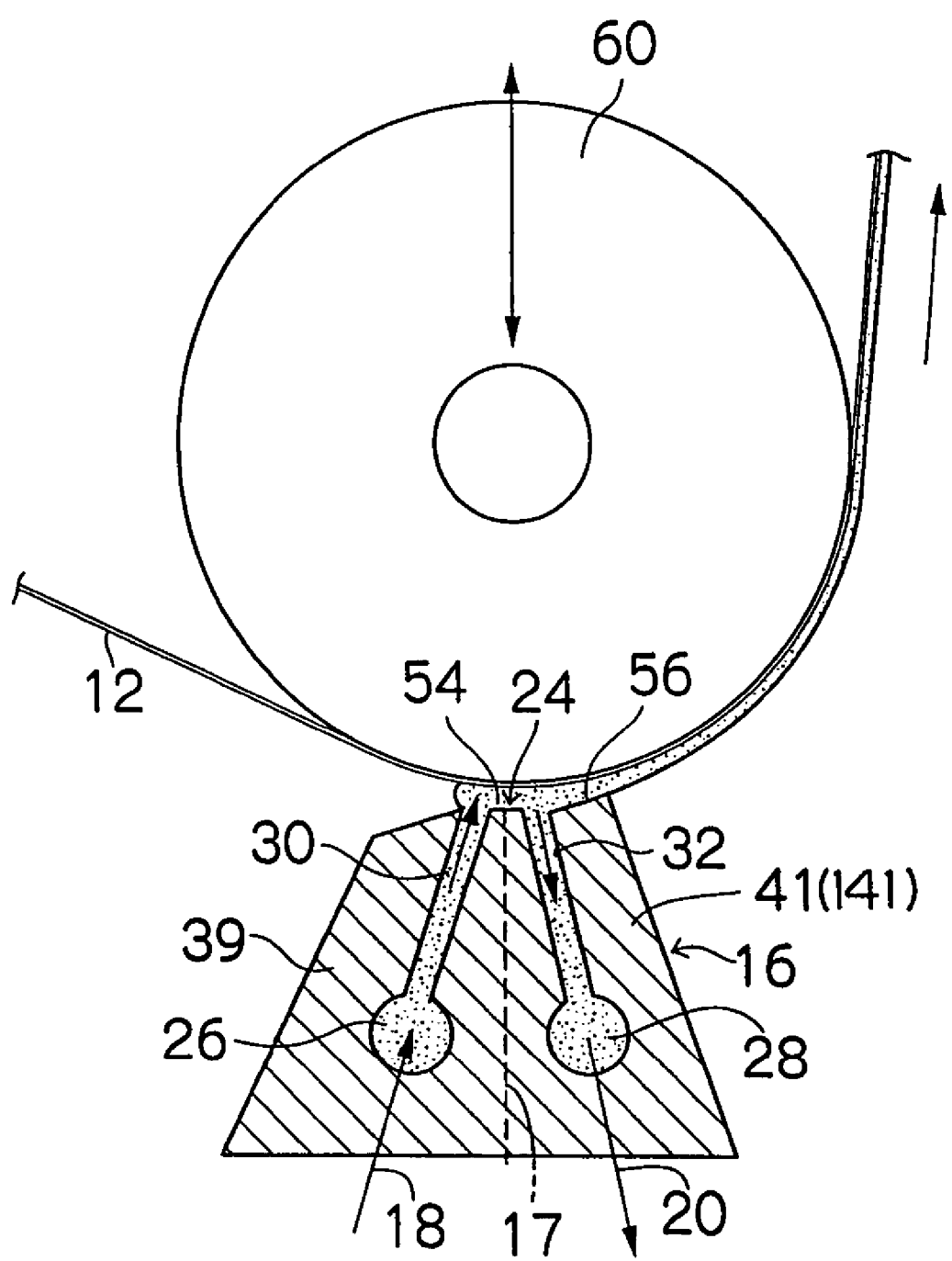
FIG. 4 is a schematic view illustrating another aspect of the integral coating apparatus of FIG. 1 or 7.

While in FIG. 1, the pressing force applied to the coating liquid sandwiched between the web 12 and the lip surface 24 of the coating head 16 is adjusted by adjusting the tensile force of the web 12 exerted in the running direction of the web with the pair of guide rollers 14, 14, FIG. 4 illustrates another aspect of applying pressuring force to the coating liquid applied to the web 12. Specifically, a back-up roller 60 is arranged on the backside of the web 12, to which no coating liquid is applied, in such a manner as to face the coating head 16. The pressing force is adjusted by sliding the back-up roller 60 back and forth relative to the coating head 16 to vary the clearance between the coating head 16 and the back-up roller 60. As a sliding mechanism of the back-up roller 60, any mechanisms can be employed as long as they can provide the back-up roller with a slight sliding, and, for example, the mechanism of a feed screw can be employed. In this case, the back-up roller may be formed out of an elastic material so as to adjust the pressing force by varying at least one of the modulus of longitudinal elasticity and the hardness of the back-up roller. Further, though not shown in the figure, a spraying device which sprays a fluid may be arranged on the back side of the web 12, to which no coating liquid is applied, in such a manner as to face the coating head 16 to obtain a pressing force and the pressing force may be varied by adjusting the spraying pressure of the spraying device.

Figure 5:
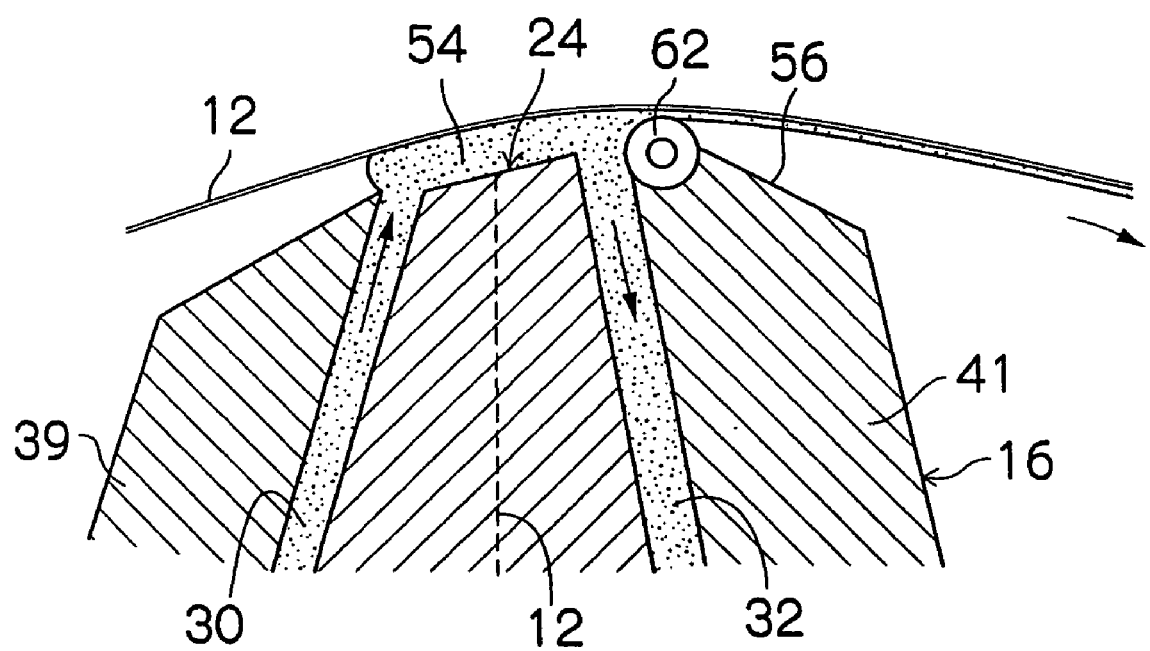
FIG. 5 is a schematic view illustrating another aspect of the scraping-off portion at which an excess coating liquid is scraped-off with a rotating rod.

While in FIG. 3 the lip surface is illustrated taking an example where the shapes of the doctor lip surface 54 and the recovering lip surface 56 of the lip surface 24 of the coating head 16 have curvatures in the form of a circular arc projecting toward the web 12 so as to allow the coating liquid to be scraped-off easily, a rotating rod 62 may be provided on the tip of the recovering lip surface 56 on the recovering slit 32 side, as shown in FIG. 5, to allow the coating liquid to be scraped-off easily. The rotating rod 62 can be rotated in the same direction or in the reverse direction relative to the running direction of the web 12; however, preferably the rod is rotated in the reverse direction.

As described so far, in the first embodiment of the present invention, the coating head 16 is provided with two slits: the coating slit 30 and the recovering slit 32, and the excess amount of coating liquid having been applied to the web 12 by discharging the coating liquid to excess from the coating slit 30 is scraped-off and recovered through the recovering slit 32. Thus, since the coating liquid is being sandwiched between the lip surface 24 of the coating head 16 and the web 12 during the time from the completion of the pre-coating operation until the scraping-off operation, a closed system can be formed in which the coating liquid is not exposed to the atmosphere during the time from the completion of the pre-coating operation until the scraping-off operation, which the prior art cannot accomplish. Further, as described above, the supplying/recovering lines 18, 20 as a closed system are constructed between the coating head 16 and the coating liquid tank 36; accordingly, the entire coating apparatus 10 can be constructed as a closed system. This makes it hard to expose the coating liquid having been recovered to the atmosphere, which prevents the solvent in the coating liquid from volatilizing, causing no changes in fluid physical properties such as viscosity and solid content concentration. In addition, dust and the like from the outside of the recovering line becomes hard to be included in the coating liquid.

Furthermore, since the edge portion of the recovery port 32A of the recovering slit 32 and the recovering lip surface 56 on the downstream side relative to the recovering slit 32 serve as a scraping-off surface of the blade of the coating apparatus currently in use, the coating liquid having been scraped-off can be reused without doing any one of the fluid adjusting treatment and the filtering treatment, while maintaining the features of the scraping-off type of extrusion coater, which is suitable for obtaining a uniform and extremely thin coating film. Accordingly, the coating apparatus 10 of the present invention is suitable to obtain a uniform and extremely thin magnetic layer which is required in manufacturing magnetic recording media and preferably the wet thickness of the magnetic coating liquid applied to the web 12 is 5 μm or less. The coating apparatus 10 of the present invention is particularly suitable to apply a coating liquid to the web 12 to thickness of, more preferably, as extremely thin as 2 μm or less.

Preferable coating conditions are as follows: the coating speed is 50 to 600 m/min, more preferably 50 to 300 m/min; the final thickness of the magnetic coating liquid (dry thickness) is 0.5 μm or less, more preferably 0.2 μm or less.

And the fluid viscosity is 1 Pa·s (10 poise) or less, more preferably 0.2 Pa·s (2 poise) or less at 100 (1/sec); and 0.01 Pa·s (10 centipoise) or less, more preferably 0.005 Pa·s (5 centipoise) or less at 40000 (1/sec).

Figure 6:
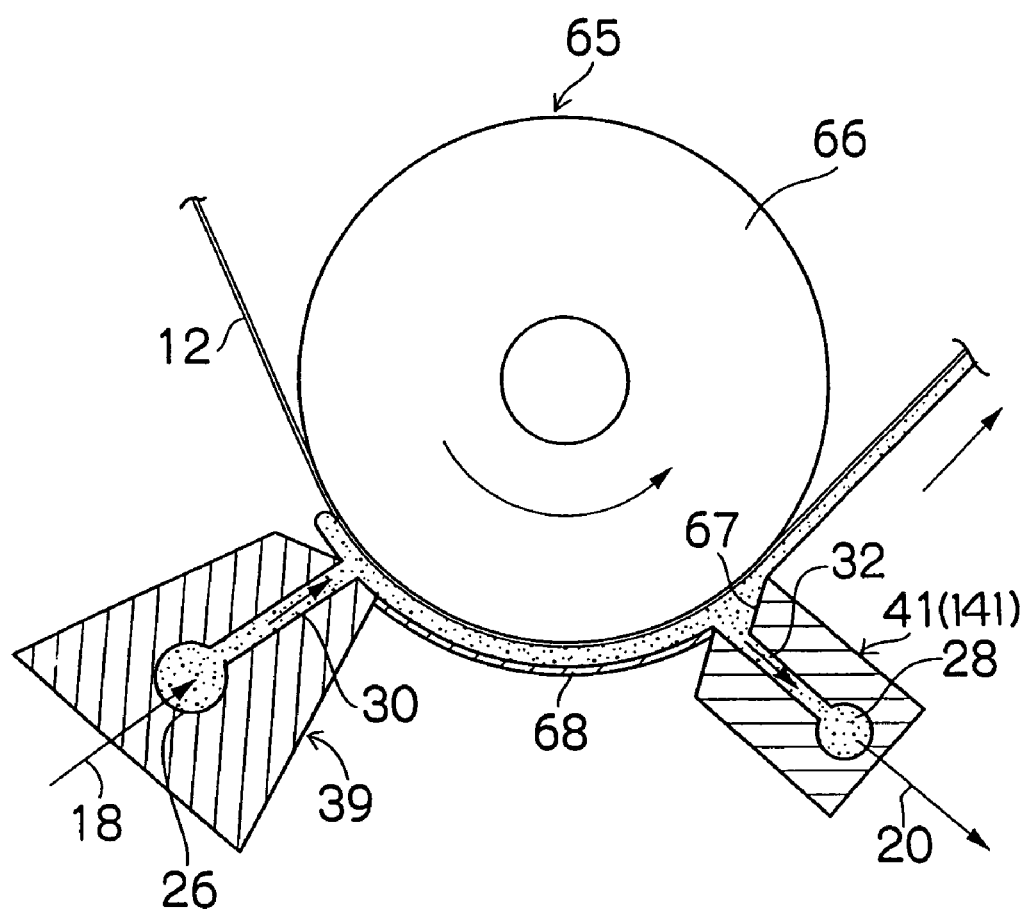
FIG. 6 is a schematic view illustrating another aspect of the coating apparatus in the first or second embodiment of the present invention, in which a pre-coating portion and a scraping-off portion, or a pre-coating portion and a suction portion are separately formed.

FIG. 6 is a schematic view illustrating another aspect of the first embodiment of the present invention, in which the pre-coating portion 39 of a pre-coating device 31 and the scraping-off portion 41 of a scraping-off device 33 are separately formed and arranged in such a manner as to be away from each other.

As shown in FIG. 6, according to a coating apparatus 65, the web 12 runs with its back side born by a back-up roller 66 of a large diameter and the pre-coating portion 39 and the scraping-off portion 41 are arranged away from each other and adjacent to the circumferential surface of the back-up roller 66. In the pre-coating portion 39 and the scraping-off portion 41, the coating pocket portion 26, the recovering pocket portion 28, the coating slit 30 and the recovering slit 32 are formed similar to the coating apparatus 10 of FIG. 1. And an arc-shaped cover plate 68 is provided along the running route of the web, that is, along the circumferential surface of the back-up roller 66. The coating apparatus 65 also includes the supplying line 18 and the recovering line 20 as a closed system, which are not shown in FIG. 6 since they are the same as those illustrated in FIG. 1.

According to the coating apparatus 65 constructed as above, the coating liquid applied to the web 12 to excess through the coating slit 30 of the pre-coating portion 39 moves to the scraping-off portion 41 in state where it is sandwiched between the web 12 and the cover plate 68, and the excess amount of the coating liquid is scraped-off into the recovering slit 32 at the scraping-off portion 41. Thus, in the coating apparatus 65 of FIG. 6, similar to the coating apparatus 10 of FIG. 1, the coating liquid can avoid being exposed to the atmosphere during the time from the completion of the coating operation to the scraping-off operation. In this case, if the clearance between the web 12 and the cover plate 68 is too large, an air layer is formed between the coating liquid and the cover plate 68, causing the solvent to be likely to volatilize from the coating liquid. Accordingly, the clearance should be almost as large as the coating thickness of the coating liquid applied to the web 12 to excess. It is, however, essential that the clearance is larger than the intended final coating thickness.

While the coating apparatus has been described in this embodiment taking an example of extrusion coater type of apparatus which is provided with the coating slit 30 in its pre-coating portion 39, in cases where the pre-coating portion 39 and the scraping-off portion 41 are separately formed as shown in FIG. 6, coaters of various types such as roll coater type, gravure coater type and bar coater can also be used. And for the scraping-off portion 41, a doctor blade, rod or the like can be used. The most important thing is that the coating apparatus is constructed in such a manner as to allow the excess amount of coating liquid applied to the web 12 not to be opened to the atmosphere until it is scraped-off. While in FIG. 6, the excess amount of the coating liquid is scraped-off with the edge portion of the recovering slit 32 of the scraping-off portion 41 and the recovering lip surface 56, the rotating rod 62 as illustrated in FIG. 5 may also be provided on the scraping-off portion 41.

In the following, the coating apparatus of a second embodiment according to the present invention will be described. In the second embodiment, the same parts as those of the first embodiment will be described with like reference characters, and when the same drawings are used both in the first and second embodiments, the reference characters of the second embodiment are put in parentheses.

Figure 7:
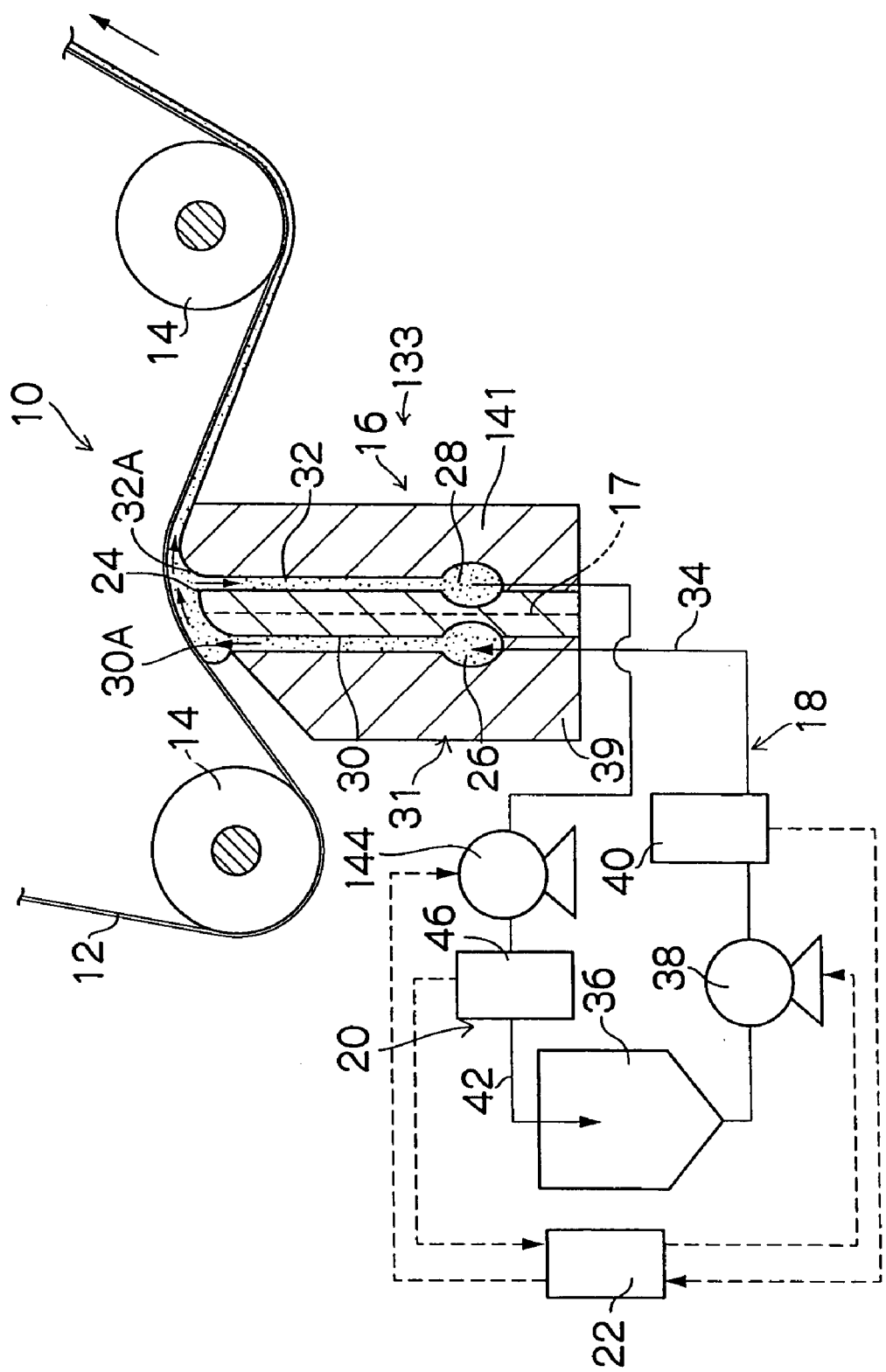
FIG. 7 is a schematic view illustrating the second embodiment of the coating apparatus of the present invention, in which a pre-coating portion of a pre-coating device and a suction portion of a suction device are integrated into a coating head.
Figure 8:
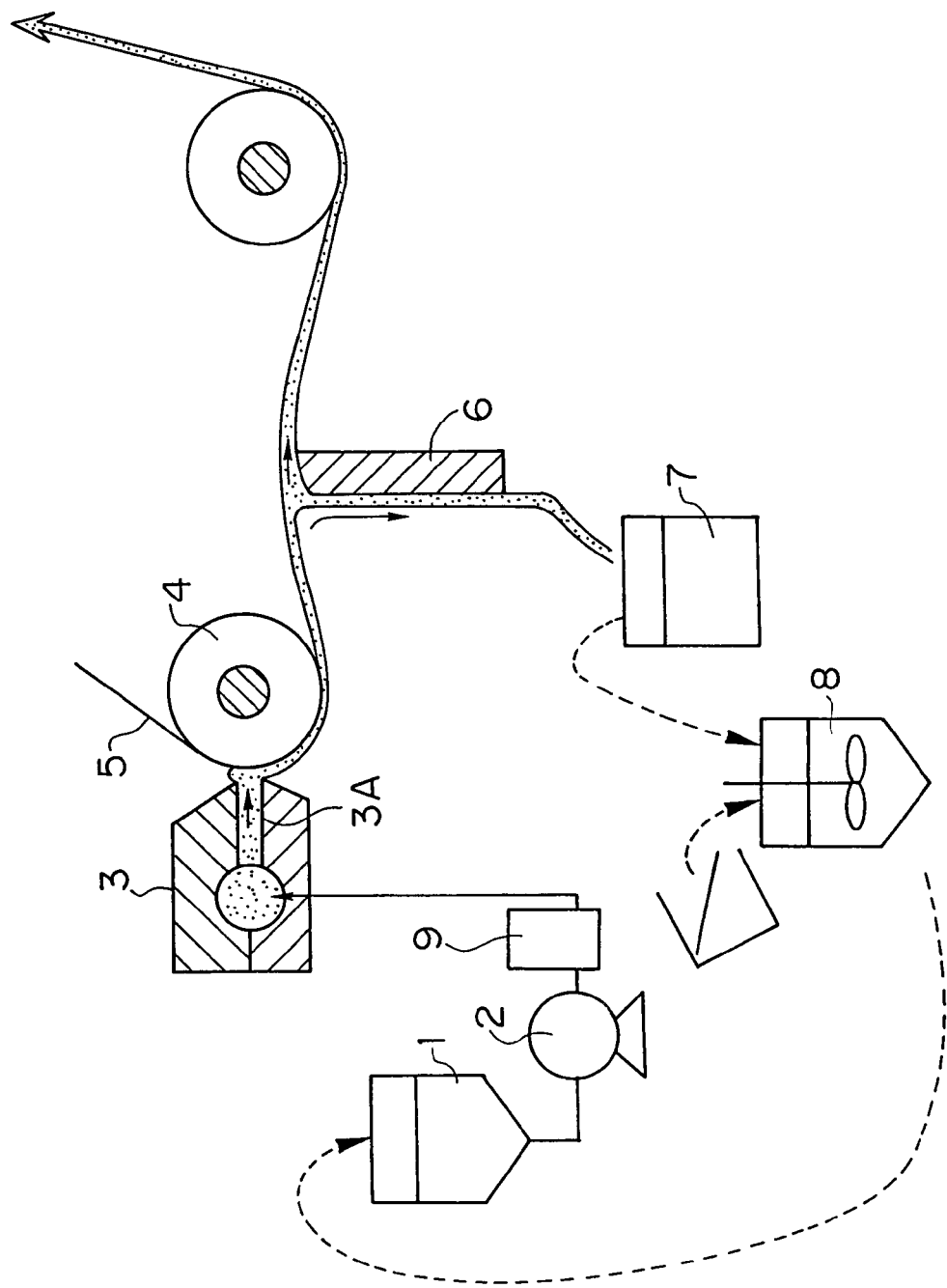
FIG. 8 is a block diagram illustrating the entire construction of the conventional scraping-off type of coating apparatus.

FIG. 7 is a schematic view illustrating the entire construction of the coating apparatus according to the second embodiment of the present invention, in which the pre-coating portion 39 of the pre-coating device 31 and a suction portion 141 of a suction device 133 are integrated into the coating head 16. If the integrated coating head 16 is divided for explanation into the pre-coating portion 39 and the suction portion 141, the two portions are marked off from each other with a broken line 17 shown in the coating head 16.

As shown in FIG. 7, the coating apparatus 10 of the second embodiment comprises the guide roller 14 for guiding the running web 12, the coating head 16, the pre-coating device 31, the suction device 133, and the controller 22 for controlling the pre-coating device 31 and the suction device 133. The coating head 16 is arranged in such a manner as to face the continuously running web 12 with its lip surface 24, which is provided on the tip thereof, adjacent to the web 12.

The pre-coating device 31 comprises the pre-coating portion 39 formed on the coating head 16 and the supplying line 18 for supplying the coating liquid to the pre-coating portion 39 in an amount in excess of the amount required for coating the web 12. And the suction device 133 comprises the suction portion 141 formed on the coating head 16 and the recovering line 20 for recovering express amount of the coating liquid sucked-up at the suction portion 141.

As shown in FIGS. 7 and 2, within the coating head 16 the pair of cylindrical pocket portions 26, 28, comprising the coating pocket portion 26 and the recovering pocket portion 28, are formed in parallel with each other in the widthwise direction of the web. Within the coating head 16, the coating slit 30 with the discharge port 30A in the lip surface 24 and the recovering slit 32 with the recovering port 32A in the lip surface 24 on the downstream side relative to the discharge port 30A as seen along the running direction of the web 12 are also formed and the coating slit 30 and the recovering slit 32 are in communication with the coating pocket 26 and the recovering pocket 28, respectively. Thus, the pre-coating portion 39 and the suction portion 141 are integrated into the coating head 16. The coating pocket portion 26 is connected to the supplying line 18 and the recovering pocket portion 28 is connected to the recovering line 20. The coating slit 30 and the recovering slit 32 are narrow passageways connecting the respective pocket portions 26, 28 and the lip surface 24 and are extended in the widthwise direction of the web 12. A coating liquid is supplied from the supplying line 18 to the coating pocket 26 of the coating head 16 in an amount in excess of the desired amount to be applied to the web 12, and the excess amount of coating liquid having been recovered through the recovering slit 32 into the recovering pocket portion 28 is discharged into the recovering line 20. Various aspects of the coating head 16 in which the coating liquid is supplied to the coating pocket portion 26 are the same as those of the firs embodiment.

The description of the supplying line 18 is omitted since it is the same as described in the first embodiment of FIG. 1. Meanwhile, the recovering line 20 is such that its recovering piping 42 connects the recovering pocket portion 28 and the coating liquid tank 36 and in the middle of the recovering piping 42 are provided a suction pump 144 for varying the amount of the coating liquid sucked-up from the recovering slit 32 and the recovery flowmeter 46 for measuring the amount of the coating liquid flowing through the recovering piping 42. Thus, the supplying/recovering lines 18, 20 as a closed system which are not opened to the atmosphere are constructed between the coating head 16 and the coating liquid tank 36.

The description of guide rollers 14 is omitted since they are the same as described in the first embodiment of FIG. 1. While in FIG. 7 the web 12 is allowed to be adjacent to the lip surface 24 of the coating head 16 by the pair of guide rollers 14, the back-up roller 60 may be arranged on the back side of the web 12, to which no coating liquid is applied, in such a manner as to face the coating head 16. In this case, the back-up roller 60 may be formed out of an elastic material.

Into the controller 22 are inputted the measured values of the amount of the coating liquid supplied and the amount of the coating liquid recovered, which are measured with the supply flowmeter 40 and the recovery flowmeter 46, respectively. Further, in the controller 22, an operation is conducted to determine whether or not the difference in amount between the coating liquid having been supplied and the coating liquid having been recovered corresponds to the desired amount of the coating liquid applied to the web 12, and if the difference does not correspond to the desired amount, the controller 22 controls at least one of the supply pump 38 and the suction pump 144 to make both amount correspond to each other.

In the following, the working of the second embodiment of the coating apparatus 10 constructed as above will be described.

The coating liquid pumped out to excess from the coating liquid tank 36 with the supply pump 38 and supplied to the coating pocket portion 26 of the coating head 16 rises up through the coating slit 30 and is discharged from the discharge port 30A, while the amount of the coating liquid flowing through the supplying piping 34 is measured with the supply flowmeter 40 and inputted into the controller 22. The coating liquid discharged to excess from the discharge port 30A is applied to the web 12 while forming a bead between the lip surface 24 of the coating head 16 and the web 12 running adjacent to the lip surface 24. In other words, the coating liquid supplied to excess is applied to the web 12 in such a state that the discharge force which discharges the coating liquid from the discharge port 30A and pushing force of the web 12 against the lip surface 24 of the coating head 16 are well balanced. Meanwhile, at the recovering port 32A of the recovering slit 32 formed in the lip surface 24 on the downstream side relative to the discharge port 30A in the running direction of the web, the excess amount of coating liquid is sucked-up into the recovering slit 32 by the sucking force of the suction pump 144.

The excess amount of the coating liquid sucked-up into the recovering slit 32 and accumulated in the recovering pocket portion 28 is recovered into the coating liquid tank 36 through the recovering line 20, while the amount of the coating liquid flowing through the recovering piping 42 is measured with the recovery flowmeter 46 and inputted into the controller 22.

In this coating/recovering operation, the controller 22 controls at least one of the driving speed of the supply pump 38 and the driving speed of the suction pump 144 so as to allow the difference Q obtained by subtracting the amount of the coating liquid recovered $Q_2$, which is measured with the recovery flowmeter 46, from the amount of the coating liquid supplied $Q_1$, which is measured with the supply flowmeter 40, to correspond to the desired amount of the coating liquid to be applied to the web 12. Specifically, driving the supply pump 38 and the suction pump 144 forms a circulating flow of the coating liquid starting at the coating liquid tank 36→supplying piping 34→coating pocket portion 26→coating slit 30→recovering slit 32→recovering pocket portion 28→recovering piping 42 and reaching the coating liquid tank 36, and since the amount of the coating liquid supplied $Q_1$ by the supply pump is larger than the amount of the coating liquid recovered $Q_2$ by the suction pump 144, the flow of the coating liquid is divided into two: the flow into the recovering slit 32 and the flow accompanying the web 12 at the recovery port 32A of the recovering slit 32. Accordingly, $Q_1-Q_2=Q$ is the desired amount of the coating liquid applied to the web 12, and a uniform and extremely thin coating film layer can be obtained by allowing the value Q to be small. In this case, the wet thickness $t_1$ of the coating liquid, which has been excessively supplied, between the web 12 and a doctor lip surface 54, which constitutes the lip surface 24 together with a back lip surface 52 and a recovering lip surface 56 as shown in FIG. 3, or the wet thickness of the coating liquid before being sucked into the recovering slit 32 is preferably 3 mL/m$^2$ or more (indicated with the amount of the coating liquid per 1 m$^2$). The reason is that if the wet thickness $t_1$ is too thin, fluid pressure (pressing force applied to the coating liquid) sufficient to eliminate the air which accompanies the web 12 is not generated, as a result, defect such as streak defect is likely to occur on the surface of the coating film obtained on the web 12 as an end product.

The coating speed, the final thickness of the magnetic coating liquid (dry thickness) and the coating liquid viscosity, as preferable coating conditions, in this case are the same as described in the first embodiment. The materials for and the surface roughness of the blocks on which the doctor lip surface 54 and the recovering lip surface 56 have been formed are also the same as described in the first embodiment.

As described so far, according to the second embodiment of the present invention, the coating head 16 is provided with two slits: the coating slit 30 and the recovering slit 32, and the excess amount of coating liquid having been applied to the web 12 by discharging the coating liquid to excess from the coating slit 30 is sucked-up and recovered through the recovering slit 32. Thus, since the coating liquid is being sandwiched between the lip surface 24 of the coating head 16 and the web 12 during the time from the completion of the pre-coating operation until the scraping-off operation, the line between the coating slit 30, through which the coating liquid is applied to the web 12, and the recovering slit 32, through which the excess amount of coating liquid is sucked-up, can be a closed system where the coating liquid is not exposed to the atmosphere. Further, as described above, the supplying/recovering lines 18, 20, as a closed system, which are not opened to the atmosphere are constructed between the coating head 16 and the coating liquid tank 36; accordingly, the entire coating apparatus 10 can be a closed system line. This makes it hard for the solvent in the coating liquid to volatilize, causing fewer changes in liquid physical properties such as viscosity and solid content concentration and preventing dust and the like outside of the recovering line from being included in the coating liquid. Furthermore, since the excess amount of the coating liquid is forcibly sucked-up into the recovering slit 32 with the suction pump 144, the amount of the coating liquid sucked-up is easy to control; thus the coating apparatus of the present invention is suitable to obtain a uniform and extremely thin coating film layer.

Thus, the coating apparatus of the present invention can provide a uniform and extremely thin coating film layer which is equal or superior to that of the conventional scraping-off type of extrusion coater using a doctor blade, and the recovered coating liquid can be reused without doing any one of the fluid adjusting treatment and the filtering treatment. Accordingly, the coating apparatus 10 of the present invention is suitable to obtain a uniform and extremely thin magnetic layer, which is required in manufacturing magnetic recording media, and the wet thickness of the magnetic coating liquid applied to the web 12 is preferably 5 μm or less. The coating apparatus 10 of the present invention is particularly suitable to apply a coating liquid to the web 12 to the thickness of, more preferably, as extremely thin as 2 μm or less.

FIG. 6 is a schematic view illustrating another aspect of the second embodiment of the present invention, in which the pre-coating portion 39 and the suction portion 141 are separately formed and arranged in such a manner as to be away from each other. As seen from FIG. 6, the coating apparatus 65 is constructed in the same manner as described in the first embodiment, except that it has the suction portion 141 instead of the scraping-off portion 41; accordingly, the description of the apparatus is omitted. According to the coating apparatus 65 constructed as above, the coating liquid applied to the web 12 to excess through the coating slit 30 of the pre-coating portion 39 moves to the suction portion 141 in state where it is sandwiched between the web 12 and the cover plate 68, and the excess amount of the coating liquid is sucked into the recovering slit 32 at the suction portion 141. Thus, in the coating apparatus 65 of FIG. 6, similar to the coating apparatus 10 of FIG. 7, the coating liquid can avoid being exposed to the atmosphere during the time from the completion of the coating operation to the sucking operation. The clearance between the web 12 and the cover plate 68 in this case is the same as described in the first embodiment. In cases where the pre-coating portion 39 and the scraping-off portion 41 are separately formed as shown in FIG. 6, coaters of various types such as roll coater type, gravure coater type and bar coater can also be used without using the extrusion coater type as the pre-coating portion 39 as shown in FIG. 1.

EXAMPLES

Example 1

Tests were conducted for obtaining a product with a thin coating film layer using an integral coating apparatus shown in FIG. 1 in which the pre-coating portion and the scraping-off portion are integrated into the coating head. And the coating thickness was also examined when reusing as a coating liquid the coating liquid having been recovered at the scraping-off portion without doing any one of the fluid adjusting treatment and the filtering treatment.

(Coating Liquid Used for Tests)

Five types of coating liquid (A, B, C, D, E) shown in Table 2, which were different in viscosity and solid content concentration, were prepared based on the formulation of coating liquid shown in Table 1 and used.

TABLE 1

| Formulation of Coating liquid | Part by weight |
|---|---|
| Co substituted BaFe<br>Average particle diameter 0.1 μm,<br>Plates ratio 3.3, | 300 |

TABLE 1-continued

| Formulation of Coating liquid | Part by weight |
|---|---|
| Average thickness 0.03 μm,<br>Anti-magnetic force 660 Oe | |
| Polyvinyl chloride-acetate -<br>Maleic anhydride copolymer<br>(polymerization degree 450) | 45 |
| Amyl stearate | 10 |
| Lecithin | 3 |
| Chrome oxide | 5 |
| Methyl ethyl ketone (MEK)<br>Cyclohexanone | Adjusted depending on the viscosity and the solid content concentration of coating liquid |

TABLE 2

| Name of Coating liquid | Viscosity (40000/sec) | Solid Content Concentration (%) | Main Solvent |
|---|---|---|---|
| A | 0.0081 Pa · s | 33 | MEK:Cyclohexanone = 1:1 |
| B | 0.0055 Pa · s | 26 | MEK:Cyclohexanone = 1:1 |
| C | 0.0039 Pa · s | 23 | MEK:Cyclohexanone = 1:1 |
| D | 0.0085 Pa · s | 26 | Cyclohexanone |
| E | 0.0067 Pa · s | 23 | Cyclohexanone |

(Testing Conditions)

A coating head with coating width of 1000 mm, coating slit gap of 0.2 mm, recovering slit gap 0.5 mm and PET (polyethylene terephthalate) film 15 μm thick, as a web, were used.

Tests, test 1 to test 11, were conducted at 11 test areas under different conditions with respect to 4 factors: type of coating liquid, coating speed, pressing force applied to coating liquid at scraping-off portion, and flow resistance of recovering line, and a comparison was made among the coating thickness values obtained by respective tests. In test 1, the coating thickness was also examined when reusing the recovered coating liquid without doing any one of the coating liquid adjusting treatment and the filtering treatment.

The coating speed was varied within the range of 50 to 200 m/min and the flow resistance of the recovering line was varied while adjusting the opening amount of the valve provided on the recovering line. The pressing force against the coating liquid was varied while varying the tensile force exerted in the running direction of the web within the range of 7 to 30 kgf/m.

Test results are shown in Table 3.

TABLE 3

| Test No. | Type of Coating liquid | Coating Speed m/min | Tensile Force of Web kgf/m | Amount of Valve Opening (Full-open 100%) | Coating Thickness (μm) |
|---|---|---|---|---|---|
| 1 | A | 100 | 24 | 100 | 0.45 |
| 2 | B | 100 | 24 | 100 | 0.26 |
| 3 | C | 100 | 24 | 100 | 0.18 |
| 4 | D | 100 | 24 | 100 | 0.36 |
| 5 | E | 100 | 24 | 100 | 0.31 |
| 6 | C | 50 | 24 | 100 | 0.12 |
| 7 | C | 200 | 24 | 100 | 0.41 |
| 8 | C | 100 | 17 | 100 | 0.24 |
| 9 | C | 100 | 30 | 100 | 0.14 |
| 10 | C | 100 | 7 | 60 | 0.26 |

TABLE 3-continued

| Test No. | Type of Coating liquid | Coating Speed m/min | Tensile Force of Web kgf/m | Amount of Valve Opening (Full-open 100%) | Coating Thickness (μm) |
|---|---|---|---|---|---|
| 11 | C | 100 | 7 | 80 | 0.55 |
| 12 | Reuse | 100 | 24 | 100 | 0.45 |

As seen from the test results shown in Table 3, particularly from the comparison among the results of test 1 to 5 which were conducted under the same conditions except only one factor, type of coating liquid, the coating thickness can be varied just by varying the type of coating liquid. As seen from the results of tests 3, 6 and 7 which were conducted under the same conditions except one factor, coating speed, the coating thickness can be varied by varying the coating speed; the faster the coating speed becomes, the larger the coating thickness becomes. As seen from the results of tests 3, 8, 9 and 10 which were conducted under the same conditions except only one factor, tensile force, the coating thickness can be varied by varying the tensile force; the larger the tensile force becomes, the smaller the coating thickness becomes. As seen from the results of tests 10 and 11 which were conducted under the same conditions except only one factor, flow resistance, the coating thickness can be varied by varying the flow resistance; the larger the flow resistance becomes, the larger the coating thickness becomes.

Thus, the final coating thickness can be varied by controlling the type (viscosity, solid content concentration) of coating liquid, the coating speed, the pressing force applied to coating liquid at scraping-off portion (tensile force of web) and the flow resistance of recovering line (amount of valve opening).

When reusing the coating liquid having been recovered at the scraping-off portion through the pre-coating device without doing any one of the coating liquid adjusting treatment and the filtering treatment, the coating thickness obtained was the same as that of test 1 and no dust was included in the coating liquid having been recovered.

These results show that the coating method and apparatus of the present invention enables the coating liquid having been scraped-off to be reused without doing any one of the coating liquid adjusting treatment and the filtering treatment while maintaining the features of the scraping-off type of coater, which is suitable to obtain a uniform and extremely thin coating film layer.

While the present invention has been described taking an example in which the coating apparatus shown in FIG. 1 is used, the same results can be obtained when using the coating apparatus in which an integral coating head and a back-up roller are combined, as shown in FIG. 4, or using the coating apparatus of which scraping-off portion includes a rotating rod, as shown in FIG. 5, or using a coating apparatus in which separately formed pre-coating portion and scraping-off portion and a back-up roller are combined in FIG. 6.

Example 2

As one of the suitable conditions when using the coating apparatus of the present invention shown in FIG. 7, a suitable wet thickness $t_1$ of the coating liquid, which has been discharge too excess through the coating slit and applied to the web, was sought in relation to the surface condition of the coating film formed on the web.

The web, coating head, coating conditions used for the tests were as follows. The composition of the coating liquid used is shown in Table 4.

TABLE 4

| Composition of Coating liquid | Part by weight |
|---|---|
| Co substituted BaFe Average particle diameter 0.1 μm, Plates ratio 3.3, Average thickness 0.03 μm, Anti-magnetic force 660 Oe | 300 |
| Polyvinyl chloride-acetate - Maleic anhydride copolymer (polymerization degree 450) | 45 |
| Amyl stearate | 10 |
| Lecithin | 3 |
| Chrome oxide | 5 |
| Methyl ethyl ketone (MEK) | 300 |
| Cyclohexanone | 300 |

As a web, PET film with 32 μm thick was used.

As a coating head, the one including two slits: a coating slit with a slit gap of 0.2 mm and a recovering slit with a slit gap of 0.5 mm was used. Of the lip surface at the tip of the coating head, the back lip surface was flat, and as for the doctor lip surface and the recovering lip surface, the doctor lip surface with the radius R of the curvature of 10 mm or 4 mm and the recovering lip surface with the radius R of the curvature of 3 mm or 6 mm were properly combined and used.

As for the coating conditions, the coating liquid was applied to the web at a coating speed (a running speed of the web) of 100 m/min to provide a coating width of 0.3 m. The amount of the coating liquid supplied $Q_1$ (mL/min) and the amount of the coating liquid sucked-up through the recovering slit $Q_2$ (mL/min) were varied among test 1 to test 10 as shown in FIG. 2, and the difference $Q=Q_1-Q_2$ was applied to the web. The values $t_1$, $t_2$, t shown in Table 5 were obtained by converting the values $Q_1$, $Q_2$ and Q into wet thickness. They are calculated by the following equation, for example, $$t_1(mL/m^2)=Q_1(mL/min)/\text{coating speed}(m/min)/\text{coating width}(m).$$

The test results are shown in Table 5.

TABLE 5

| Test | Q1 mL/min | Q2 mL/min | Q mL/min | $t_1$ mL/m² | $t_2$ mL/m² | t mL/m² | Surface Condition of Coating Film |
|---|---|---|---|---|---|---|---|
| 1 | 250 | 200 | 50 | 8.3 | 6.7 | 1.7 | Satisfactory |
| 2 | 200 | 150 | 50 | 6.7 | 5.0 | 1.7 | Satisfactory |
| 3 | 150 | 100 | 50 | 5.0 | 3.3 | 1.7 | Satisfactory |

TABLE 5-continued

| Test | Q1 mL/min | Q2 mL/min | Q mL/min | $t_1$ mL/m² | $t_2$ mL/m² | t mL/m² | Surface Condition of Coating Film |
|---|---|---|---|---|---|---|---|
| 4 | 100 | 50 | 50 | 5.3 | 1.7 | 1.7 | Satisfactory |
| 5 | 100 | 70 | 30 | 3.3 | 2.3 | 1.0 | Satisfactory |
| 6 | 90 | 60 | 30 | 3.0 | 2.0 | 1.0 | Satisfactory |
| 7 | 80 | 50 | 30 | 2.7 | 1.7 | 1.0 | Streak defective |
| 8 | 80 | 30 | 50 | 2.7 | 1.0 | 1.7 | Slightly streak defective |
| 9 | 60 | 20 | 40 | 2.0 | 0.7 | 1.3 | Streak defective |
| 10 | 60 | 10 | 50 | 2.0 | 0.3 | 1.7 | Streak defective |

As seen from Table 5, if the wet thickness $t_1$ of the coating liquid, which has been discharge too excess through the coating slit and applied to the web, is 3 (mL/m²) or more, on the web from which the excess amount of coating liquid has been sucked-up, a satisfactory coating film surface, free from streak defect, is formed, as shown by the results of tests 1 to test 6. However, when the wet thickness $t_1$ is 2.7 (mL/m²) or less, as shown by the results of tests 7 to 10, streak defect was observed on the coating film surface. Accordingly, the wet thickness $t_1$, as one of the suitable conditions when using the coating apparatus of the present invention, is preferably 3 (mL/m²) or more.

As seen from the comparison between test 7 and test 8, if the wet thickness $t_1$ is the same, streak defect is less likely to occur when the thickness of the final coating film is larger.

According to the coating apparatus and method of the present invention, the coating liquid having been scraped-off can be reused without doing any one of the coating liquid adjusting treatment and the filtering treatment, while maintaining the features of the scraping-off type of coater, which is suitable for obtaining a uniform and extremely thin coating film.

With the suction type coating apparatus of the present invention, a uniform and extremely thin coating film layer equal to or superior to that formed by the scraping-off type of coating apparatus, which employs a doctor blade, can be formed. In addition, the coating liquid recovered can be reused without doing any one of the coating liquid adjusting treatment and the filtering treatment.

Accordingly, the coating method and apparatus of the present invention is suitable to obtain a uniform and extremely thin magnetic layer which is required in manufacturing magnetic recording media, and particularly suitable in extremely thin coating where the wet thickness of the magnetic coating liquid applied to a web is 2 μm or less.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A coating method, comprising the steps of:
pre-coating one side of a continuously running sheet substrate strip with a coating liquid, using a pre-coating device, in an amount in excess of that capable of obtaining an intended final coating thickness; and then
sucking-up an excess amount of coating liquid using a suction device provided on a downstream side along a running direction of the substrate relative to the pre-coating device,
wherein the coating liquid having been applied to the substrate is not opened to the atmosphere during a time from the pre-coating until the sucking-up, and wherein all coating liquid that is sucked-up is recovered through a recovering line and is reused as a closed system such that the coating liquid that has been sucked-up is not exposed to air.

2. The coating method according to claim 1, wherein a sucking force of the suction device is generated with a pump.

3. The coating method according to claim 1, wherein a desired coating thickness is obtained by adjusting a fluid resistance of the recovering line.

4. The coating method according to claim 1, wherein a wet thickness of the coating liquid applied to the substrate through the pre-coating device is 3 mL/m² or more.

5. The coating method according to claim 1, wherein the desired coating thickness is obtained by adjusting at least one of the amount of the coating liquid to be used for pre-coating and an amount of the coating liquid to be sucked-up.

6. The coating method according to claim 5, wherein the amount of the coating liquid used for pre-coating and the amount of the coating liquid sucked-up are measured with flowmeters, respectively, and at least one of the amounts is adjusted to allow a difference between the two measured amounts to provide the desired coating thickness.

7. The coating method according to claim 1, wherein the desired coating thickness is obtained by adjusting a running speed of the substrate.

8. The coating method according to claim 1, wherein the desired coating thickness is obtained by adjusting a viscosity of the coating liquid.

9. The coating method according to claim 1, wherein the desired coating thickness is obtained by adjusting a solid content concentration of the coating liquid.

10. The coating method according to claim 1, wherein the coating liquid is a magnetic coating liquid with magnetic particles dispersed therein.

11. A coating apparatus, comprising:
a pre-coating device which pre-coats one side of a continuously running sheet substrate strip with a coating liquid in an amount in excess of that capable of obtaining an intended final coating thickness;
a suction device which sucks-up an excess amount of coating liquid, the suction device being arranged on a downstream side along a running direction of the substrate relative to the pre-coating device;
a closing mechanism which prevents the coating liquid having been applied to the substrate from being opened to the atmosphere between the pre-coating device and the suction device; and
a recovery system is provided such that all of the coating liquid that is sucked-up is recovered and reused as a closed system such that the coating liquid that has been sucked-up is not exposed to air.

12. The coating apparatus according to claim 11, wherein the sucking force of the suction device is generated with a metering pump.

13. The coating apparatus according to claim 11, wherein:
a pre-coating portion of the pre-coating device and a suction portion of the suction device are integrated in a coating head;
the closing mechanism is formed by allowing a lip surface of the coating head and the substrate to be adjacent to each other; and
the pre-coating portion is arranged on the upstream side of the coating head, and the suction portion is arranged on the downstream side of the coating head.

14. The coating apparatus according to claim 13, wherein:
the pre-coating portion is provided with a coating slit for discharging the coating liquid; and
the suction portion is provided with a recovering slit for recovering the coating liquid having been sucked-up.

15. The coating apparatus according to claim 14, wherein:
the coating slit is in communication with a supplying line for supplying the coating liquid to be used for pre-coating;
the recovering slit is in communication with a recovering line for recovering the coating liquid having been sucked-up;
the supplying line and the recovering line are provided with flowmeters to measure the amount of the coating liquid used for pre-coating and the amount of the coating liquid having been sucked-up, respectively; and
a flow control device is provided which controls at least one of a flow of the supplying line and a flow of the recovering line to allow a difference between the measured flows to provide the desired coating thickness.

16. The coating apparatus according to claim 13, further comprising a pair of guide rollers which laps the substrate over the lip surface of the coating head, the pair of guide rollers being arranged on upstream and downstream sides relative to the coating head.

17. The coating apparatus according to claim 13, further comprising a back-up roller which makes the substrate adjacent to the lip surface of the coating head, the back-up roller being arranged on a back side of the substrate, to which no coating liquid is applied.

18. The coating apparatus according to claim 11, wherein:
a pre-coating portion of the pre-coating device and a suction portion of the suction device are separately formed; and
the closing mechanism comprises a covering member which covers at least the surface of the substrate to which the coating liquid has been applied, the covering member being arranged along a running route of the substrate between the pre-coating portion and the suction portion.

19. The coating apparatus according to claim 18, wherein:
the pre-coating portion is provided with a coating slit for discharging the coating liquid;
the suction portion is provided with a recovering slit for recovering the coating liquid having been sucked-off; and
a back-up roller is provided in such a manner as to face both of the pre-coating portion and the suction portion.

* * * * *